July 30, 1929.  J. H. WAGENHORST  1,722,649
SHEET METAL SPOKED WHEEL AND METHOD OF MAKING THE SPOKES
Filed July 28, 1921   3 Sheets-Sheet 2

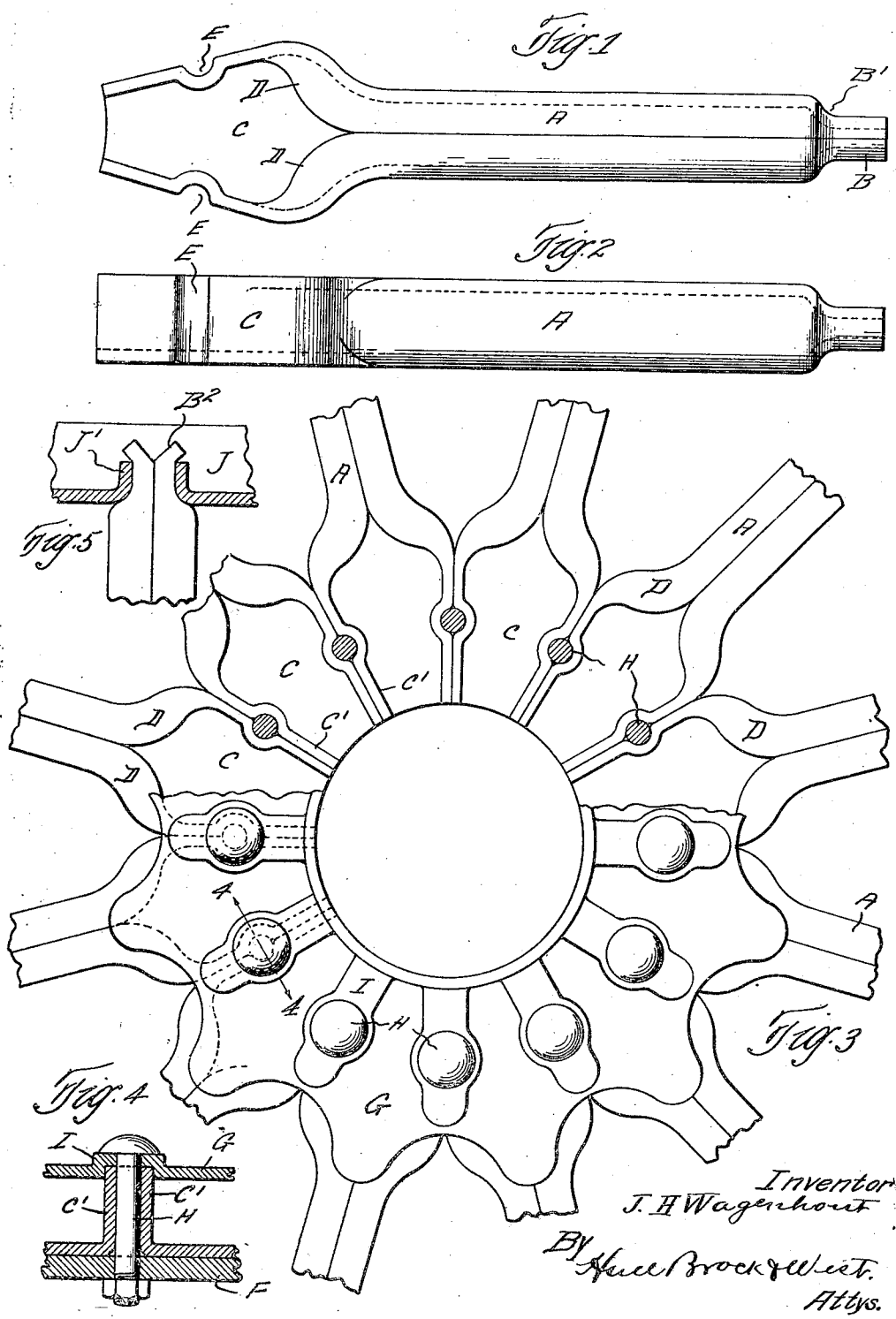

Inventor
J. H. Wagenhorst
By Hull Brock & West
Attys.

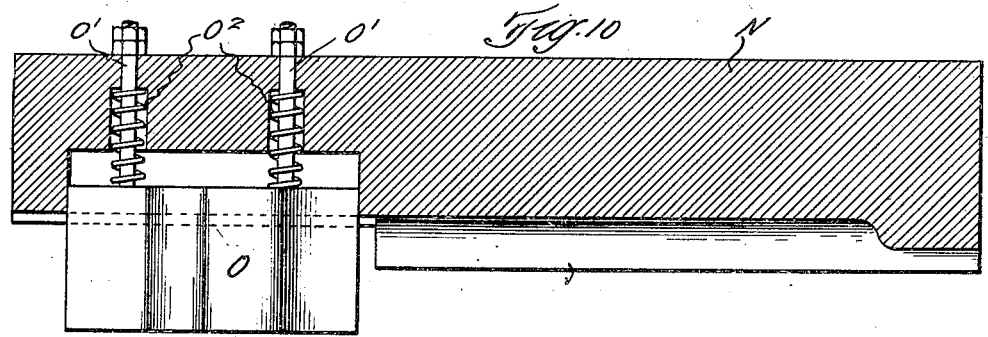
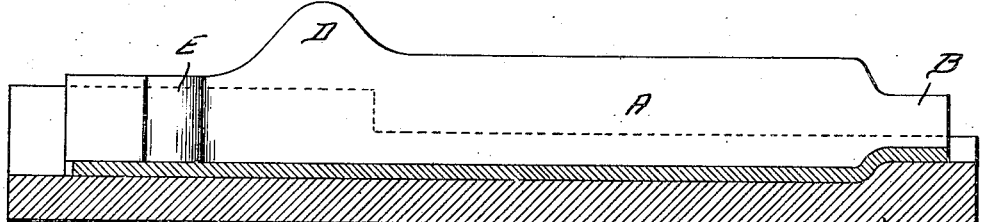
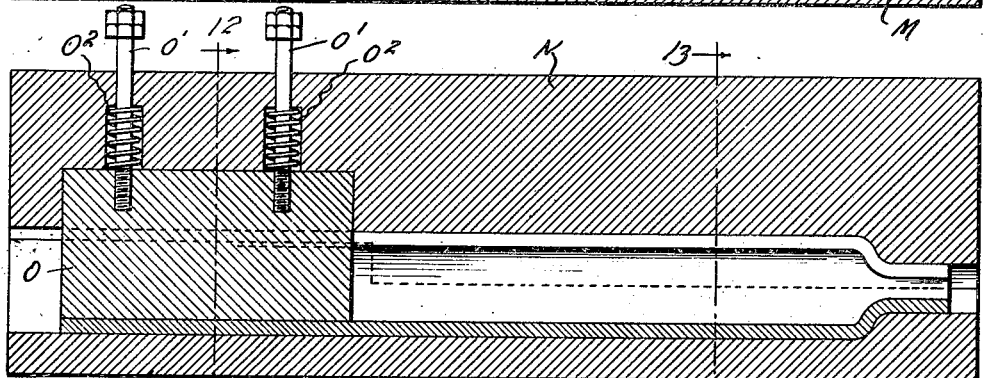
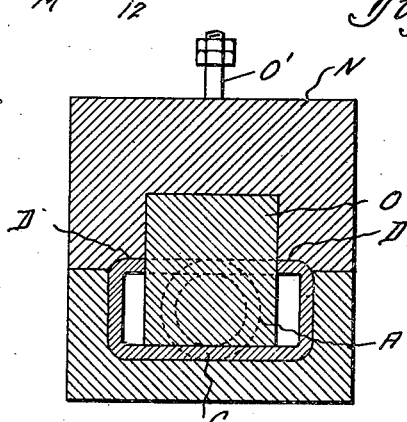
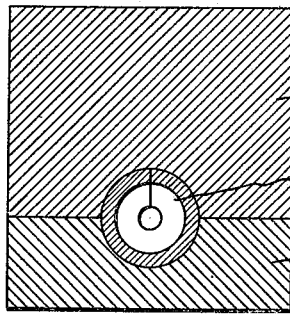

Patented July 30, 1929.

1,722,649

UNITED STATES PATENT OFFICE.

JAMES H. WAGENHORST, OF JACKSON, MICHIGAN.

SHEET-METAL SPOKED WHEEL AND METHOD OF MAKING THE SPOKES.

Application filed July 28, 1921. Serial No. 488,154.

This invention relates generally to wheels and more particularly to a wheel composed of a plurality of sheet metal spokes. The invention also relates to the method of producing said spokes.

The object of the invention is to provide a simple, durable and efficient form of sheet metal spoke which can be quickly and easily assembled to provide a wheel body and one which can also be quickly and securely connected to a sheet metal felly or fixed rim in order to complete the wheel body. With these various objects in view the invention consists in the novel features of construction, all of which will be fully described hereinafter and set forth in the appended claims.

Figure 6:
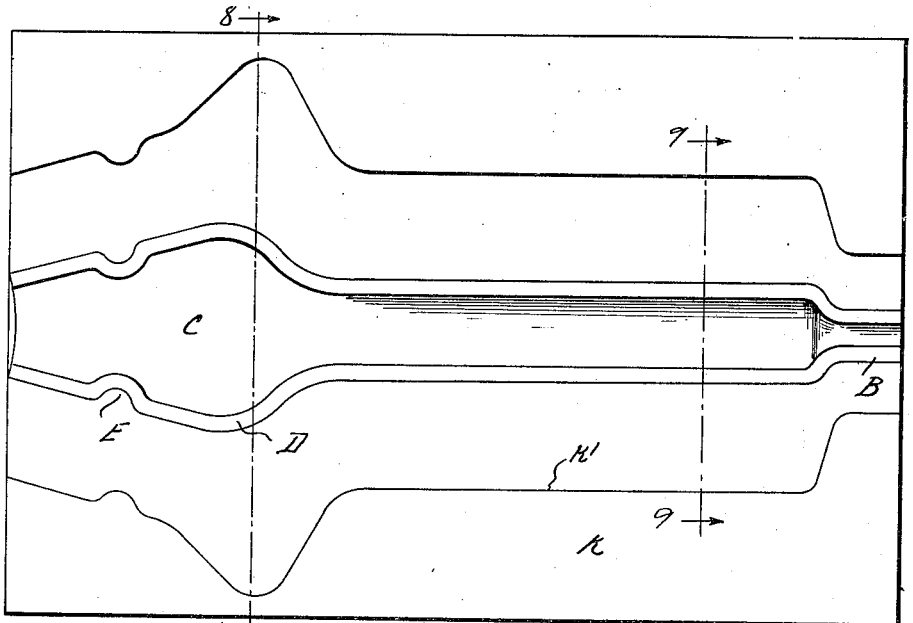
Figure 7:
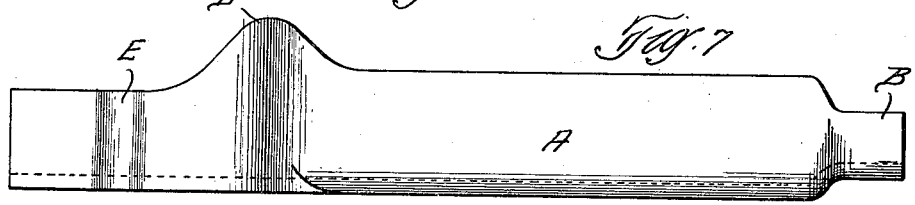
Figures 8, 9:
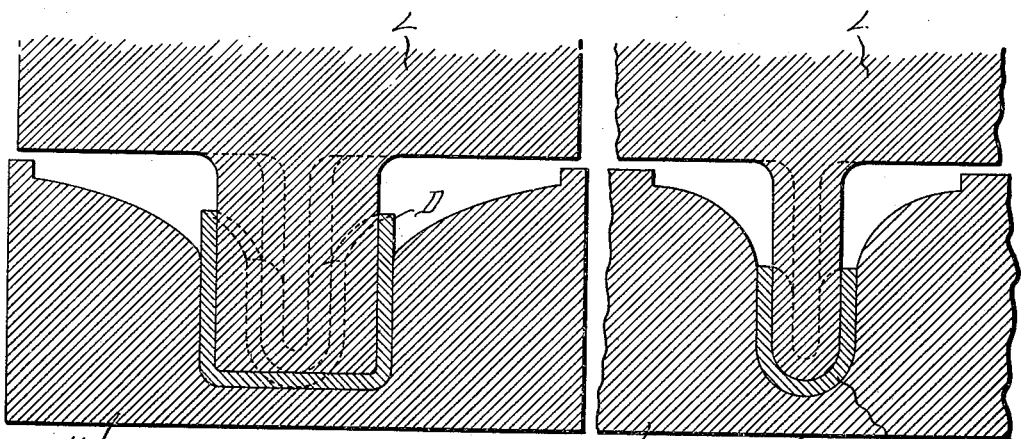
Figure 14:
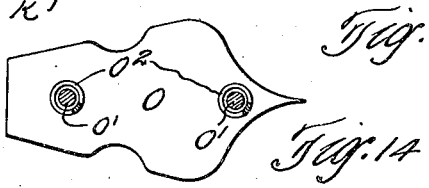

In the drawings forming part of this specification, Fig. 1 is a face view of a sheet metal spoke constructed in accordance with my invention; Fig. 2 is a side view of the same; Fig. 3 is a view showing a plurality of spokes arranged to constitute a wheel structure, a part of the hub flange being broken away in order to disclose the manner of arranging and connecting the mitered ends of the spokes; Fig. 4 is a detail sectional view on the line 4—4 of Fig. 3; Fig. 5 is a detail sectional view showing the manner of connecting the outer end of the spoke to the fixed rim or felly; Fig. 6 is a face view of the lower die employed in the first shaping operation of the spoke; Fig. 7 is a side view of the spoke after the first operation; Fig. 8 is a sectional view taken on the plane of the line 8—8 of Fig. 6 and showing the upper and lower shaping dies; Fig. 9 is a similar view taken on the line 9—9 of Fig. 6; Fig. 10 is a longitudinal sectional view partly in elevation showing the dies for the second shaping operation; Fig. 11 is a similar view showing the completion of such second operation; Fig. 12 is a transverse sectional view on the line 12—12 of Fig. 11; Fig. 13 is a sectional view on the line 13—13 of Fig. 11; and Fig. 14 is a plan view of the movable part of the dies shown in Fig. 10.

In constructing a wheel in accordance with my invention, I employ a plurality of sheet metal spokes, each spoke being made from a flat piece of sheet metal of such contour that when shaped in the dies hereinafter more fully explained, they provide a tubular body portion A having the tenon B at the outer end thereof and the fillet B' at the juncture of the tenon and body portion A. The inner or miter end of the spoke C is substantially box-like, open at one side and having inwardly projecting edges D where the body A merges into the mitered portion C, and the sides of the box-like mitered portion are grooved axially as shown at E, so that when the spokes are properly assembled with their mitered ends together, apertures will be produced for the reception of the flange bolts, and in practice I prefer to employ the hub flange F upon one side of the wheel body and a flange G upon the opposite side of the wheel body, said flange G having bosses I which receive the abutting sides C' of the box-like miters C and the flange bolts H provided with nuts H' serve to securely connect the inner ends of the spokes and the hub flanges together.

In the shaping of the spoke body A, the edges of the blank are brought together as most clearly shown in Fig. 1 and when the spoke tenons are connected to the fixed rim J, said tenons are projected through the spoke sockets J' produced in the base of said fixed rim and then spread as indicated at $B^2$ in Fig. 5. In this manner a light and durable sheet metal wheel is provided composed of spokes each made from a flat sheet metal.

In Figs. 7 to 13 I have illustrated one method of producing said spokes and in carrying out said method I employ a lower die K upon which the blank indicated at K' is placed, and then by means of the upper die L the spoke is given the first shaping as indicated in Figs. 7, 8 and 9, the box-like shape of the miter being provided and the body and tenon half-formed. After the first shaping operation the spoke thus half-formed is removed and transferred to the lower die M, and the upper die N carrying the movable part O is brought into engagement with the half-formed spoke and the shaping operation is then completed, the body portion A and tenon B being rolled over into complete tubular form and the edges D of the miter turned inwardly as most clearly shown in Fig. 12. When the upper die N is brought into engagement with the half-formed spoke the movable member O carried by rods O' and normally held projected by springs $O^2$ passes into the box-like portion of the miter and the continued downward movement forces the block O upwardly into its recess pressing the springs and when the movable member or block O reaches its final upward position as shown in Figs. 11 and 12, the edges D will be turned inwardly to complete the spoke.

It will, of course, be understood that other methods may be employed for producing the spoke illustrated in Figs. 1 and 2.

It will thus be seen that I provide a simple and inexpensive form of sheet metal spoke from which a wheel can be quickly and easily fabricated, and also a simple and inexpensive method and apparatus for producing such form of spoke.

Having thus described my invention, what I claim is:

1. A wheel spoke formed from a plate of sheet metal folded longitudinally to provide a tubular body portion including a tenon and a box-like mitered portion open at one side.

2. A wheel spoke consisting of a flat plate of metal folded longitudinally to provide a tubular body portion including a tenon and a box-like mitered portion open at one side, said box-like mitered portion being provided with grooves formed in the opposite side walls thereof.

3. A wheel comprising a plurality of sheet metal spokes, each having its body portion formed into tubular shape and provided with a tenon and having an integral box-like miter portion comprising a rear wall and two side walls disposed in planes at right angles to the rear wall and converging, the front face of said miter portion being open, and a pair of spoke flanges engaging the front and rear of the mitered portions of said spokes, the front spoke flange having radial grooves formed therein receiving the free edges of the miter side walls.

In testimony whereof, I hereunto affix my signature.

JAMES H. WAGENHORST.